United States Patent

Harrison

[11] 3,905,469
[45] Sept. 16, 1975

[54] CONVEYOR LOADING AND SELECTIVE DISCHARGE SYSTEM

[75] Inventor: John Harrison, Lincolnwood, Ill.

[73] Assignee: The Spra-Con Company, Chicago, Ill.

[22] Filed: Apr. 19, 1973

[21] Appl. No.: 352,507

[52] U.S. Cl. .................... 198/38; 198/78; 198/168; 209/74 R; 214/11 R
[51] Int. Cl. ............................................. B65g 43/00
[58] Field of Search ............ 198/38, 78, 79, 80, 21, 198/23, 168, 174, 175, 77; 214/11 R; 209/74 R, 121

[56] References Cited
UNITED STATES PATENTS

| | | | |
|---|---|---|---|
| 1,448,458 | 3/1923 | Millard et al. ......................... | 198/77 |
| 3,710,923 | 1/1973 | Fromme et al. ...................... | 214/11 R |

*Primary Examiner*—Evon C. Blunk
*Assistant Examiner*—Douglas D. Watts
*Attorney, Agent, or Firm*—McDougall, Hersh & Scott

[57] ABSTRACT

A system for loading articles on a conveyor whereby the conveyor can thereafter discharge the articles in selected discharge locations along the path of conveyor movement. The system includes a plurality of loading stations, each having transfer mechanism adapted to move articles onto adjacent supporting tables. Pusher mechanism are movable adjacent the conveyor, and the pusher mechanism are adapted to be selectively switched for movement over the tables so that the articles will be delivered to specific areas defined by the conveyor. A code is applied to the articles with the code being related to the conveyor area receiving the article and to a preselected discharge location so that an article will be automatically removed at the particular discharge location. The pusher mechanism may be used for this discharge operation. Pivoting end paddles are carried by the pusher and the end paddles are selectively opened to facilitate introduction of an article in front of a pusher. The end paddles automatically close so that the pushers operate to move articles transversely across the tables onto a conveyor.

15 Claims, 24 Drawing Figures

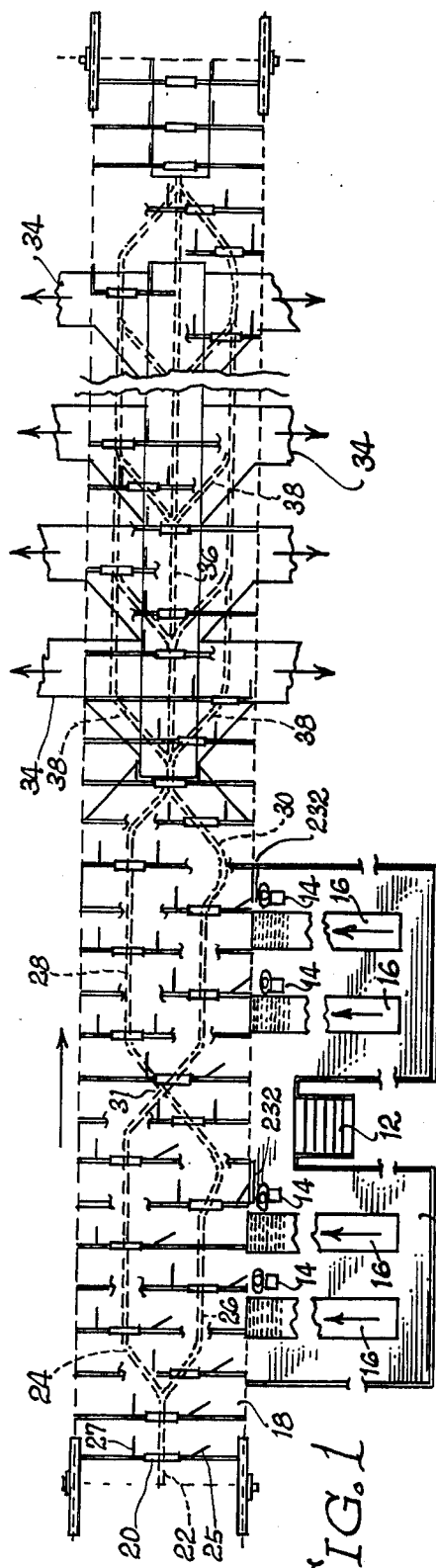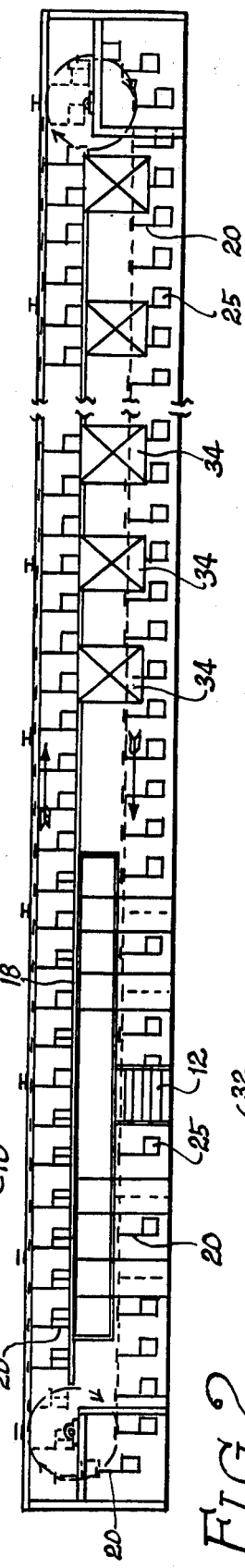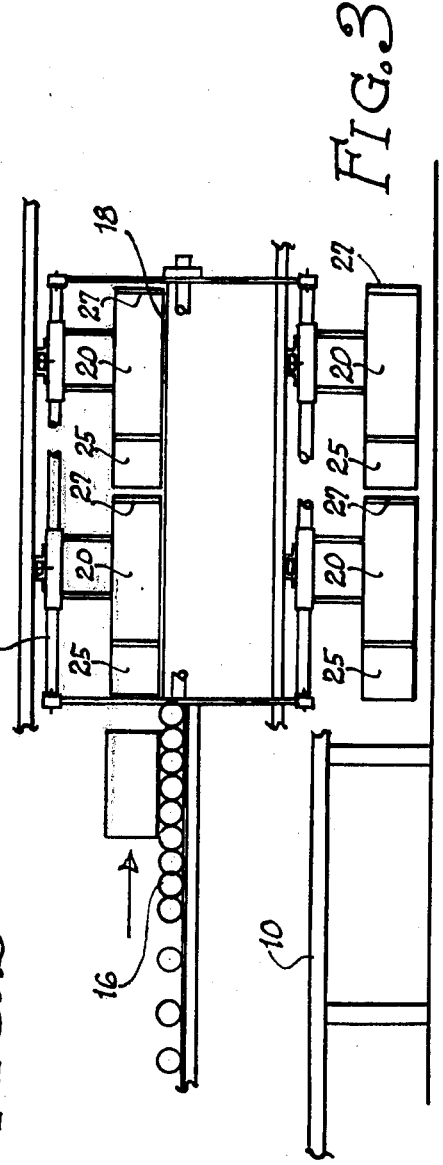

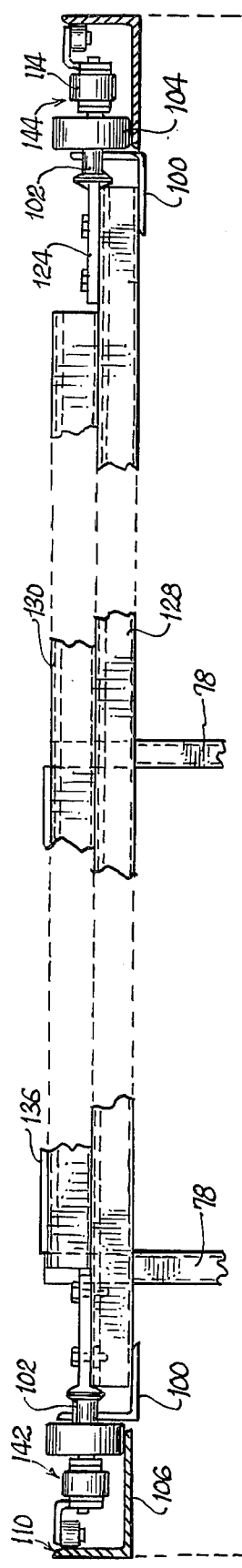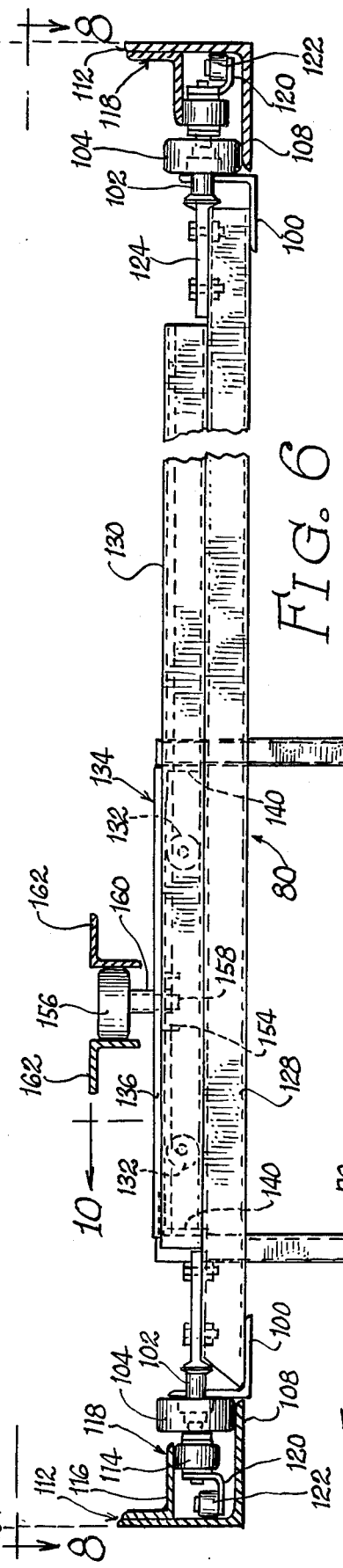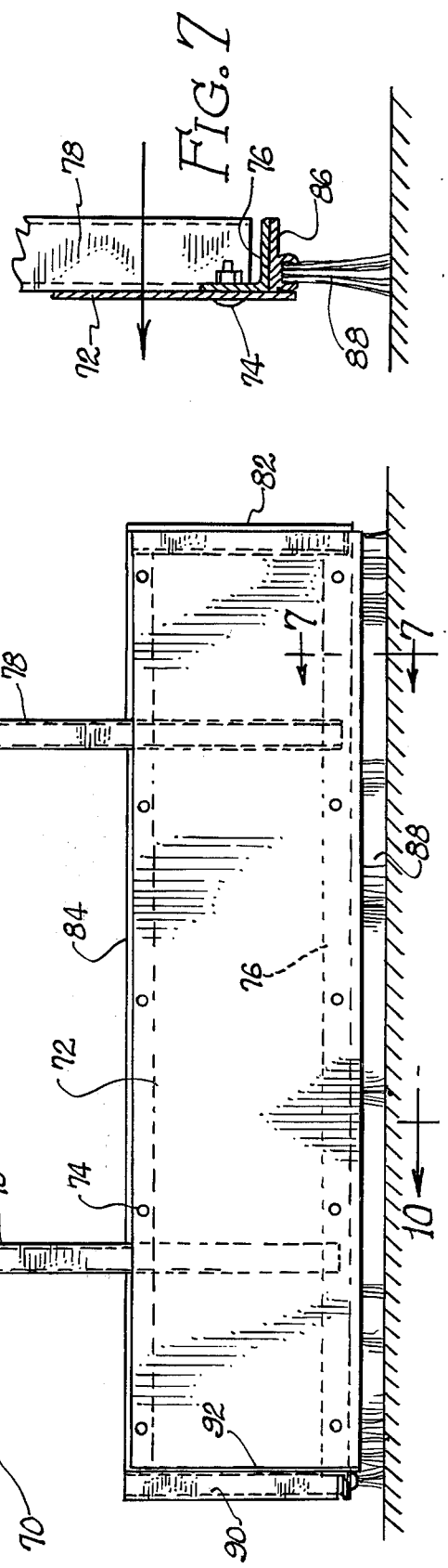
FIG. 6
FIG. 7

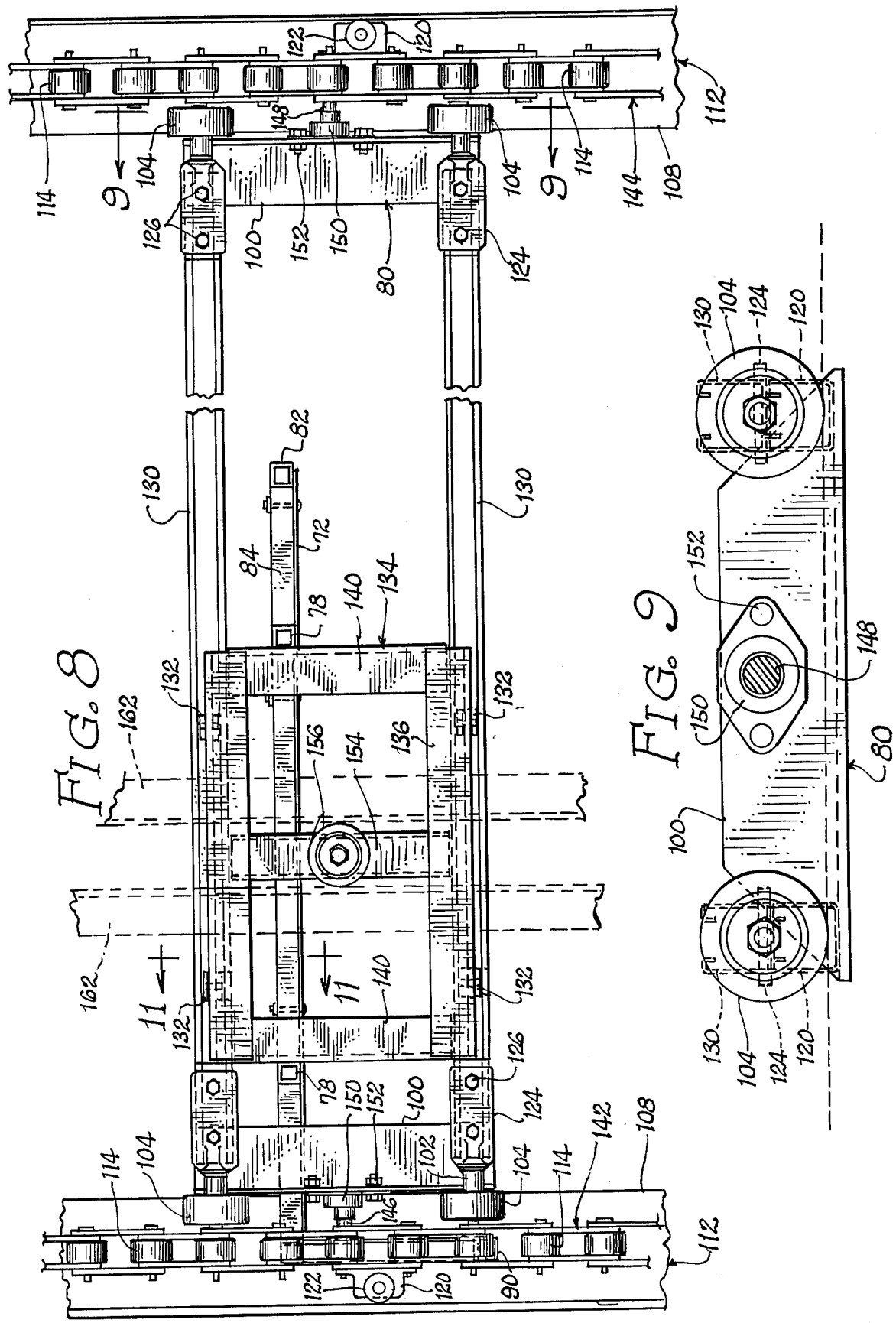

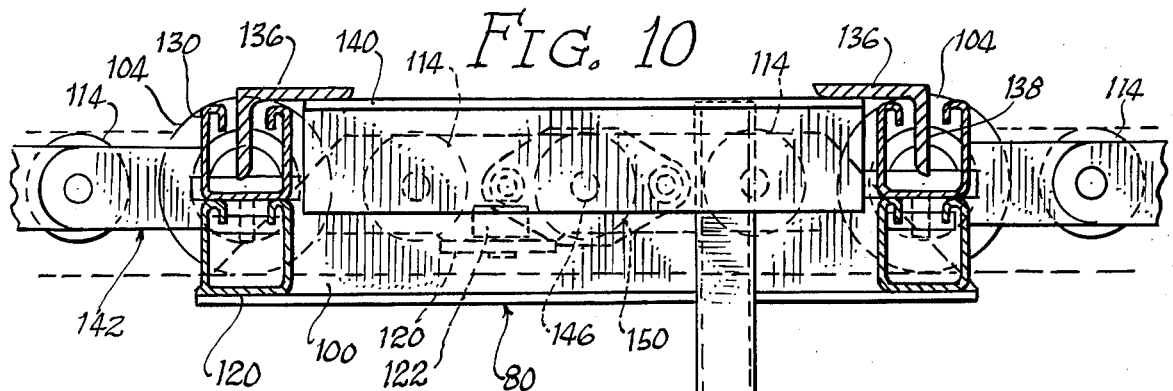
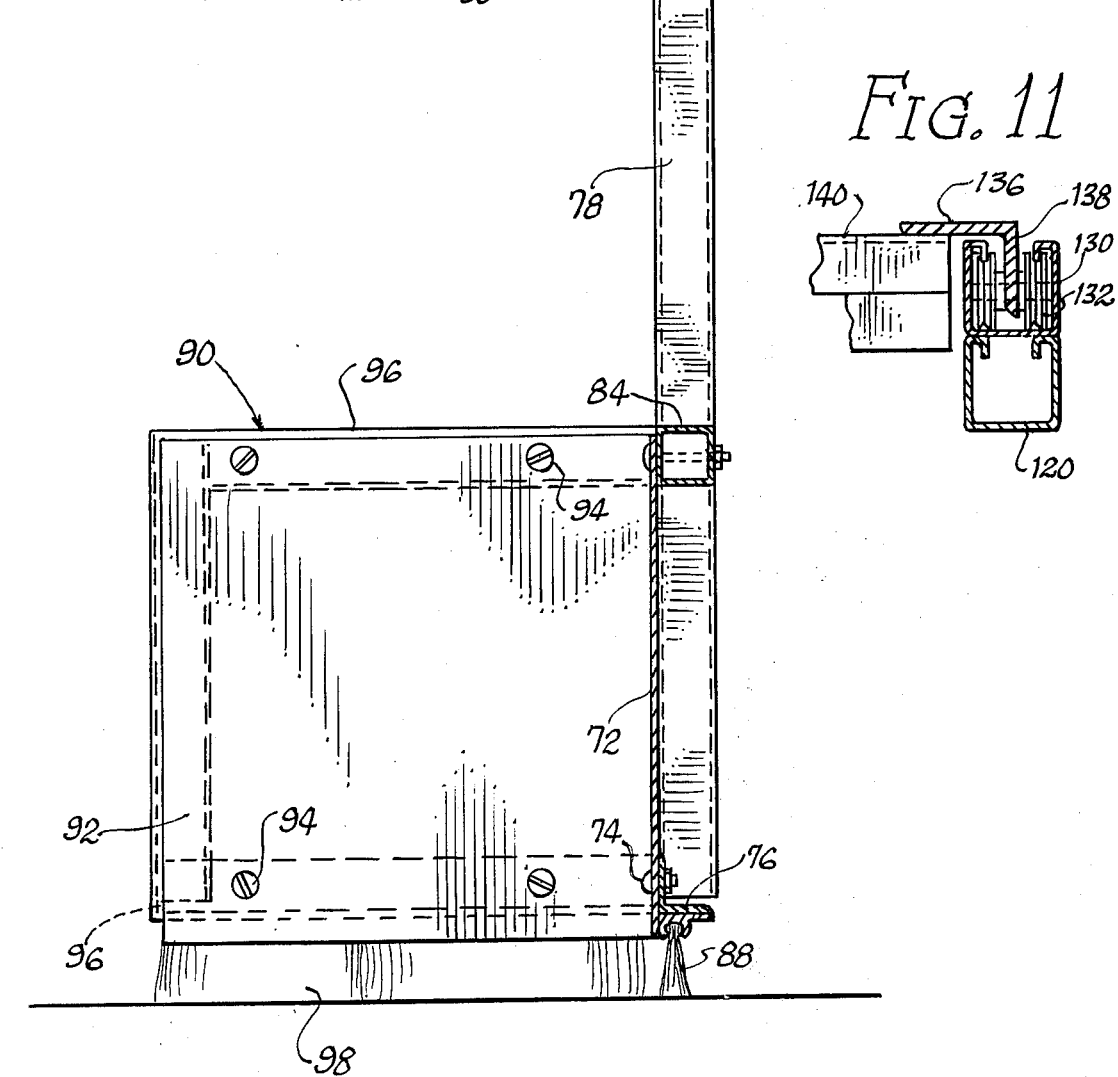

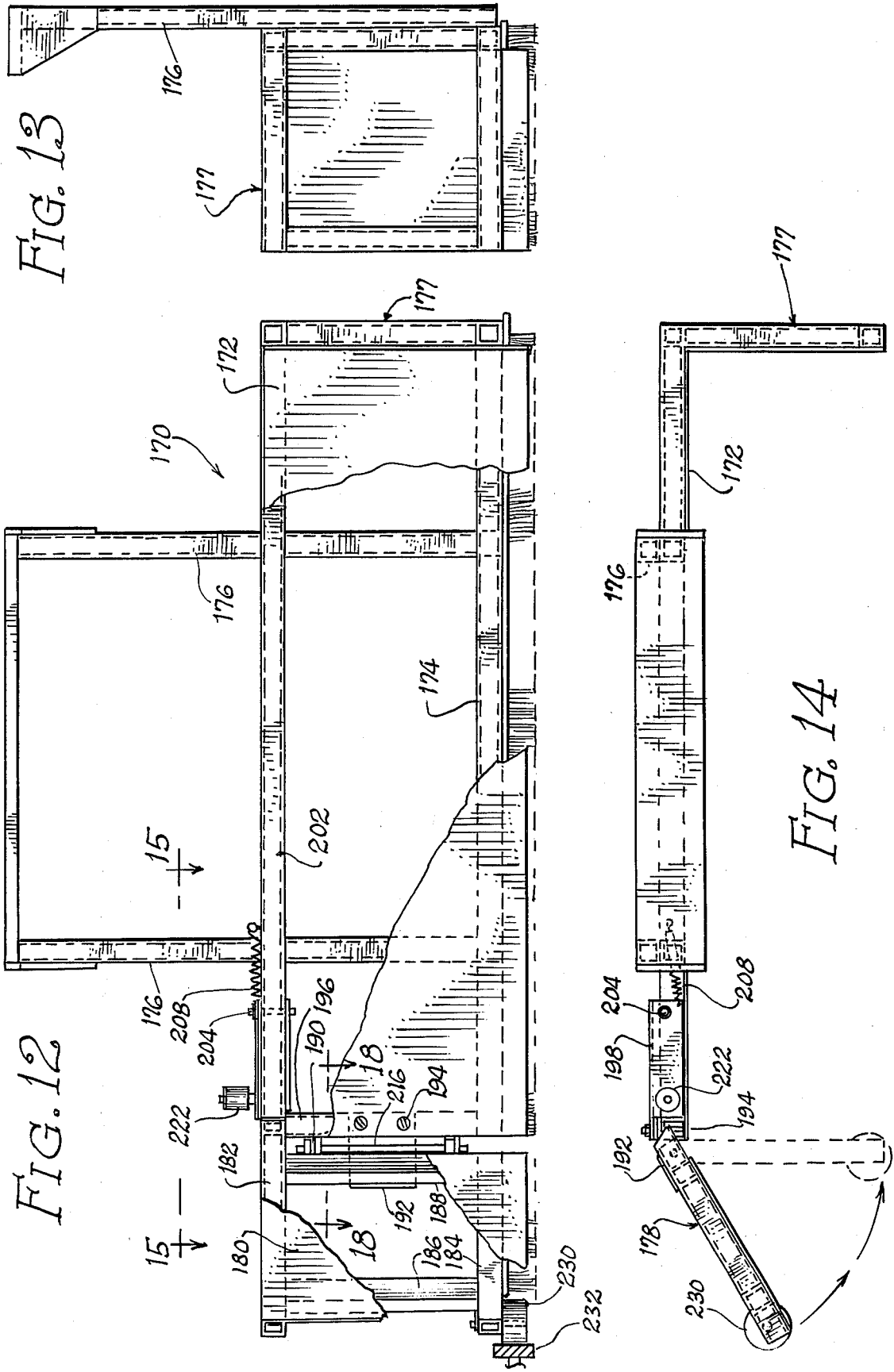

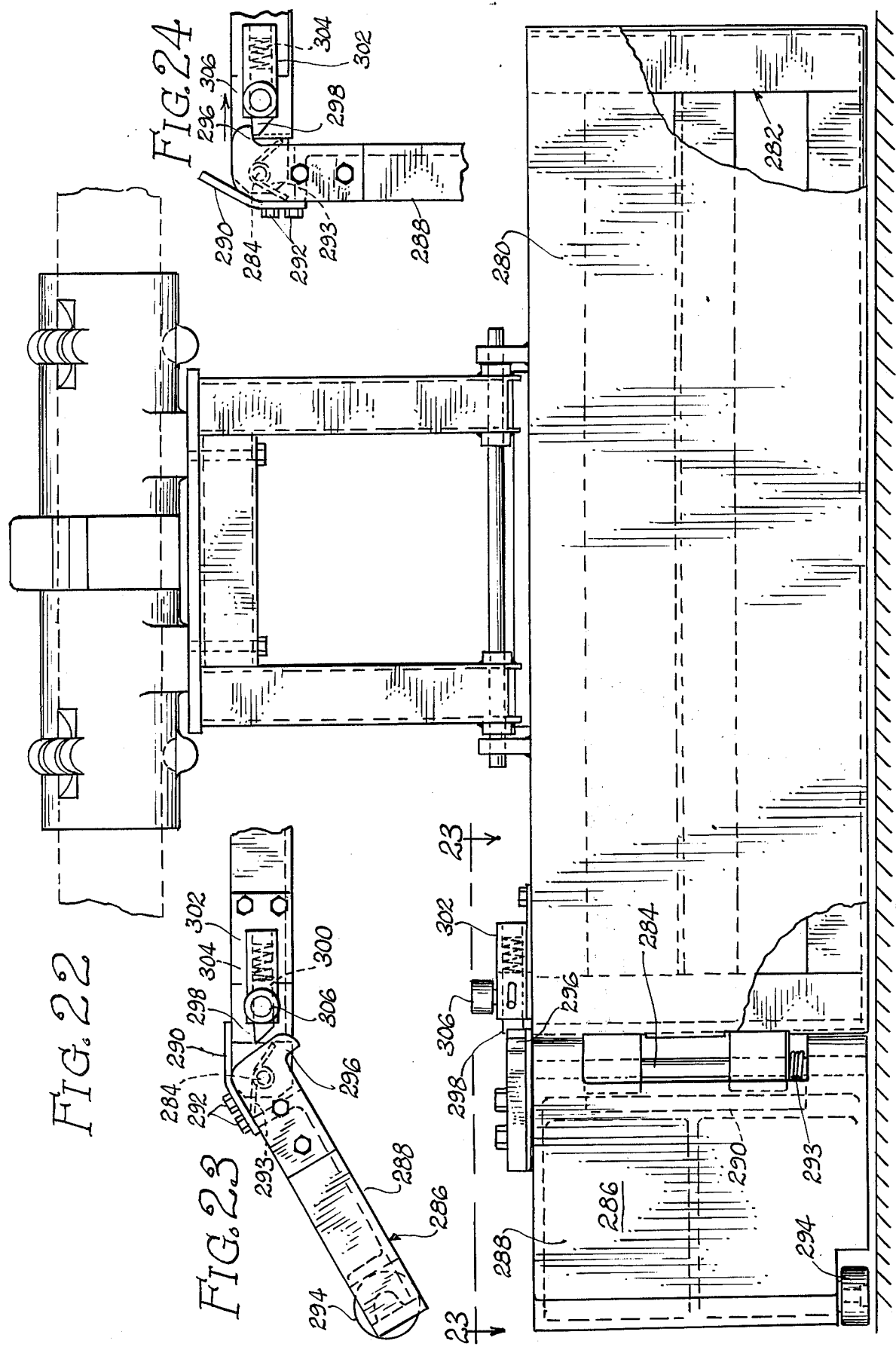

CONVEYOR LOADING AND SELECTIVE DISCHARGE SYSTEM

The invention relates to means for use in transferring articles from loading stations onto a moving conveyor. In particular, the invention is concerned with a system which permits coding of articles prior to transfer onto a conveyor with the coding and transferring being carried out in a manner such that the conveyor can move at high speed.

The system of this invention will be particularly described with reference to conveyor constructions which include automatic article discharging systems. Such systems may comprise endless conveyors moving adjacent a plurality of discharge stations located along the conveyor path. Articles are placed on the conveyor at a loading station and suitable coding means are actuated. The codes are related to the articles in a manner such that each article will be automatically discharged when it arrives at a selected one of the discharge locations. A variety of systems of this type are described in the prior art, for example as set forth in Speaker U.S. Pat. No. 3,034,665.

The conveyor constructions described in the Speaker patent comprise individual trays which carry articles to be discharged at various locations. When an article is placed on a tray, a code is assigned to the article, and the tray is adapted to automatically discharge the article in accordance with the pre-assigned code. Systems which include article carrying means other than trays have similar coding and discharge capabilities.

Problems arise with respect to the techniques employed for loading articles onto the individual trays or other conveyor means. Attempts have been made to provide for manual loading of articles; however, this technique is unsatisfactory since it severely limits the speed of conveyor movement. Thus, it is too difficult for even relatively skilled persons to apply a code and load an article on a tray carrying that code unless the conveyor is moving at a relatively low speed.

Mechanical means have been proposed for loading articles onto moving conveyors. Systems are described, for example in Harrison, et al. U.S. Pat. No. 3,333,677 and 3,339,699. These systems provide a table located above the path of conveyor movement with means being provided for sweeping articles off the table and onto moving conveyor trays. In other systems, mechanical loading means are situated at the side of a conveyor, and articles are then thrown onto conveyor trays.

In applicant's copending application Ser. No. 266,320, there is described a loading system for conveyors wherein pushers move in a controlled fashion for sweeping articles from a table and for delivering the articles to an induction belt or otherwise providing for movement of the articles onto a conveyor. The structure of the application includes at least two separate pusher arrangements with the pushers in each arrangement being spaced apart by a distance at least equal to two articles carrying positions of the conveyor. As explained in the application, this provides a substantial "window" for the induction of articles in front of the pushers whereby rapid operation of the conveyor can be achieved.

In applicant's U.S. Pat. No. 3,693,776, there is described a pusher arrangement wherein end paddles are employed with the pushers having a degree of transverse movement as well as longitudinal movement. The end paddles are adapted to "corner" an article so that the article can be swept from a table onto a conveyor in the course of combined longitudinal and transverse movement of a pusher. The end paddles are pivotally connected so that they can be moved from the perpendicular to a parallel or "open" position so that the size of the "window" is not significantly diminished during the operation.

It is a general object of this invention to provide improvements in means for loading articles onto conveyors and for discharging the articles from the conveyors.

It is a more specific object of this invention to provide an improved system which includes pusher members for handling articles with unique control means being provided for determining the operation of the pusher means whereby even greater operating speed and operating capability can be accomplished when compared with prior aystems.

These and other objects of this invention will appear hereinafter and for purposes of illustration, but not of limitation, specific embodiments of the invention are shown in the accompanying drawings in which:

FIG. 1 is a plan view of a system characterized by the features of this invention;

FIG. 2 is a side elevation of the system;

FIG. 3 is an enlarged end view of the system;

FIG. 6 is a vertical, sectional view of the conveyor construction, particularly illustrating the pusher structure of the invention;

FIG. 7 is an enlarged fragmentary cross-sectional view taken about the line 7—7 of FIG. 6;

FIG. 8 is a plan view taken about the line 8—8 of FIG. 6;

FIG. 9 is an enlarged cross-sectional view taken about the line 9—9 of FIG. 8;

FIG. 10 is an enlarged cross-sectional view taken about the line 10—10 of FIG. 6;

FIG. 11 is an enlarged fragmentary cross-sectional view taken about the line 11—11 of FIG. 8;

FIG. 12 is an elevational view of an alternative form of pusher construction;

FIG. 13 is an end elevational view of the structure shown in FIG. 12;

FIG. 14 is a plan view of the structure shown in FIG. 12;

FIG. 22 is a vertical elevational view of an alternative form of paddle construction;

FIG. 23 is a fragmentary plan view taken about the line 23—23 of FIG. 22; and,

Figure 4:
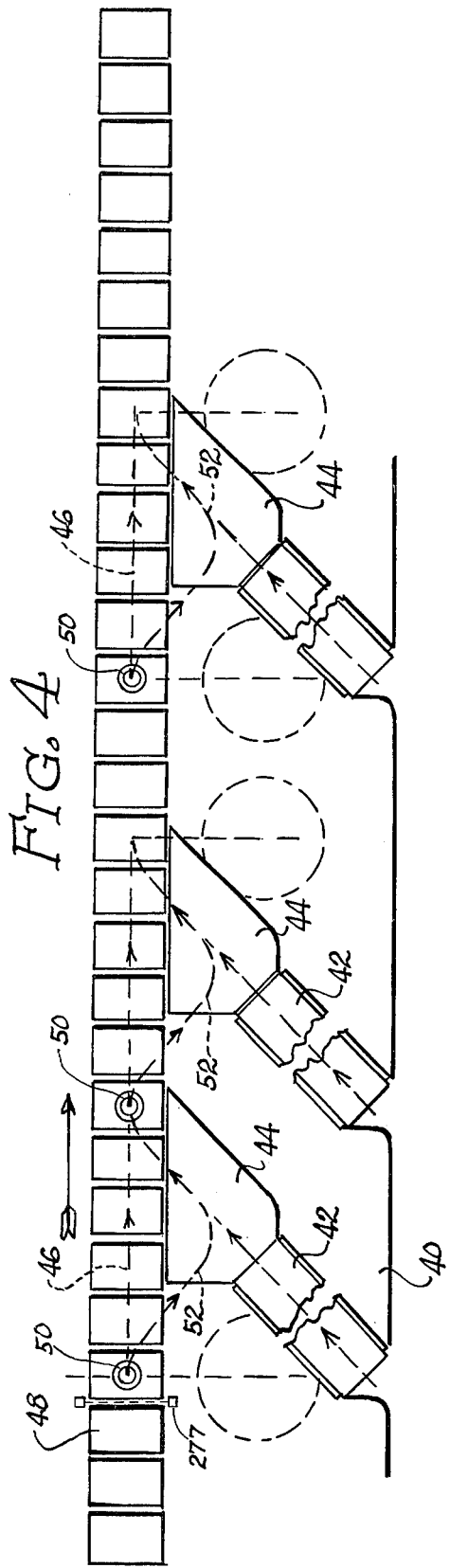
FIG. 4 is a plan view of an alternative arrangement characterized by the features of this invention.

FIG. 24 is a fragmentary plan view illustrating the structure of FIG. 23 in the closed position The invention is generally directed to a system for loading articles on a conveyor wherein table means are provided for supporting the articles with the conveyor moving adjacent the table means. Pushers are mounted for movement over the table means to engage the articles and to thereby transfer the articles to the conveyor.

Certain specific improvements of the invention concern the means for mounting the pushers. These mounting means comprise a main track which extends generally parallel to the conveyor. At least one side track extends away from the main track and switch means are located at the intersection of the main track and side track. Means normally position the switch means in the open position whereby the pushers normally remain on the main track. Means are provided, however, for operating the switch means in response to the presence of an article on the table. This results in movement of a pusher onto the side track for movement over the table so that the article is picked up by the pusher. The side track extends back to the main track so that the side track acts to guide the pusher back onto the main track with the article thereby being automatically transferred to the conveyor.

The invention is also concerned with the structure of the pushers utilized in a system of the general type described. The pushers include a pivotally mounted end paddle whereby the paddle can be moved to a closed position substantially perpendicular with the pusher whereby the pusher "corners" and article to impart transverse movement to the article, for example, movement from the table to a conveyor. The pivoting end paddle can also be moved to an open position to facilitate the insertion of an article in front of the pusher. Thus, in high speed article handling operations, delivery belts may be employed for delivering an article onto a table with the pusher moving rapidly over the table for picking up the article. By providing a maximum opening for inserting the article in front of the pusher, a corresponding increase in operating speed can be realized.

In the accompanying drawings, FIGS. 1 through 3 illustrate a conveyor system wherein articles are brought to loading platforms shown at 10. These loading platforms are elevated and are accessible to workmen by means of steps 12. Any suitable means may be employed for bringing articles to the platforms for inspection by workmen. As will be more thoroughly explained, the workmen may be assigned the task of reading addresses on the articles (as in a post office operation) and for then assigning a code to each article by using consoles 14 or other suitable means. This manual phase of the operation may be replaced by automatic reading equipment where feasible without affecting the scope of the instant invention.

Once it has been determined that an article is to be delivered to a particular destination, the article is placed on a delivery belt 16. Various systems may be utilized in this connection, and a summary of available systems can be found in the aforementioned patent disclosures. The belts 16 are provided for transferring articles onto the table 18 which is located adjacent the ends of the belts, and this transferring operation is conducted in accordance with the code assigned to the articles as explained in the aforementioned disclosures.

Articles placed on the table 18 are adapted to be engaged by pushers 20 which are continuously moving over the table. These pushers are supported on tracks as will be explained, and a guide 22, as well as guide sections 24 and 26 and 28 and 30 adjacent the delivery beds 16, control the paddle movement. An arrangement for mounting the pushers so that successive pushers will alternatively move into the divided track sections is described in the aforementioned U.S. Pat. No. 3,693,776.

The pushers are mounted for movement in Ferris wheel fashion over the table 18, and every other pusher is moved onto guide 26 for movement adjacent the first pair of belts 16. The other pushers move onto guide 24 and at the intersection 31, these other pushers move onto guide 30 for movement adjacent the second set of belts 16.

In the embodiment of FIGS. 1 through 3, end paddles 25 are located at one end of each pusher, and end paddles 27 are located at the other end. The end paddles 27 are held in a stationary right angle position relative to the pushers to accomplish the cornering previously described. The end paddles 25 are pivotally connected whereby these paddles can be opened to achieve a sufficient "window" for insertion of articles in front of the pushers.

The table 18 extends beyond the position of the delivery beds to a plurality of chutes 34 which are adapted to receive articles picked up by the pushers. In this section of the system, a center guide 36 normally guides each pusher past the chutes 34. Selectively operated switches are, however, provided whereby the pushers are adapted to move onto one of the guides 38. The selective operation of the switches is determined by the code assigned to a particular article. Accordingly, an article coded for a specific destination will be removed from the table 18, and passed to a chute 34 which corresponds with the code assigned to the article. The aforementioned patent disclosures provide disclosures of circuitry suitable for achieving selective operation of discharge mechanisms and such circuitry can be readily adapted to the system of the instant invention.

Instead of two pairs of delivery belts on the same side, one pair could be positioned on the other side of the conveyor in which case the pushers would be picking up articles while on guide 24 and the pushers would then move directly from guides 24 and 26 to guide 36. In the embodiment shown, the pushers are utilized on the upper level of travel but arrangements could be made to have an independent sorter utilizing the same pushers during their lower level travel. Thus, a lower table could be located approximately at the level of the bottom step 12.

FIG. 4 illustrates a somewhat different system for loading articles onto a conveyor. In this instance, a platform 40 supports delivery belts 42 and article supporting tables 44. Pushers are mounted for movement on a main track extending along the line 46, this line being parallel with the path of movement of conveyor trays 48. Each pusher preferably has its article engaging face in line with the trailing edge of a tray as the pushers move adjacent the belts 42. A pair of switches 50 are employed for diverting pushers onto side tracks which are positioned along the lines 52. Thus, these pushers are selectively and randomly diverted from their normal path of movement of the track 46 onto a side track 52 for sweeping articles from the tables 44 and for moving the articles onto a conveyor tray.

At the left-hand side of FIG. 4, the Ferris wheel drive for the pushers is associated with two separate switches whereby either switch may be actuated for moving any one of the pushers onto a side track. At the right-hand side of FIG. 4, the Ferris wheel support for the pushers is associated with a single switch 50 whereby each pusher is capable of being diverted onto only one side track. Obviously, the principles involved are not dependent upon the number of switches associated with a single driving mechanism, and various combinations of the arrangement illustrated can be utilized. In the particular embodiment illustrated in FIG. 4, the use of two separate driving mechanisms has the advantage that the trays 48 can be loaded with articles from one of the systems if the other system should be shut down for any reason.

Figure 5:
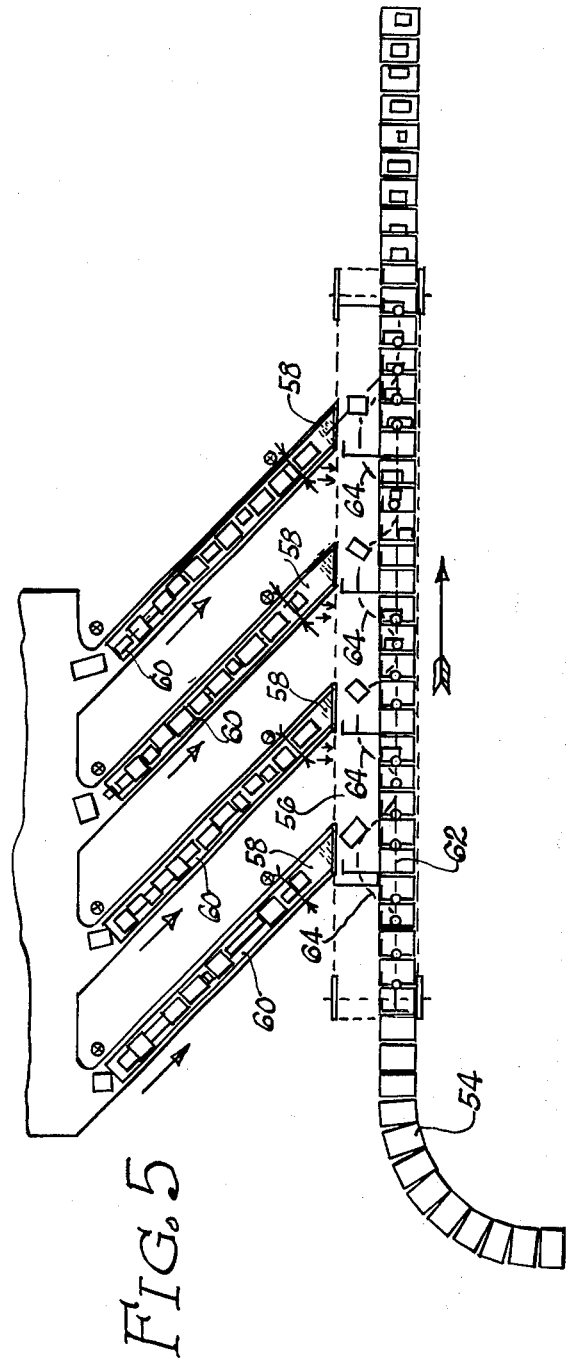
FIG. 5 is a plan view of a still further alternative arrangement.
Figure 15:
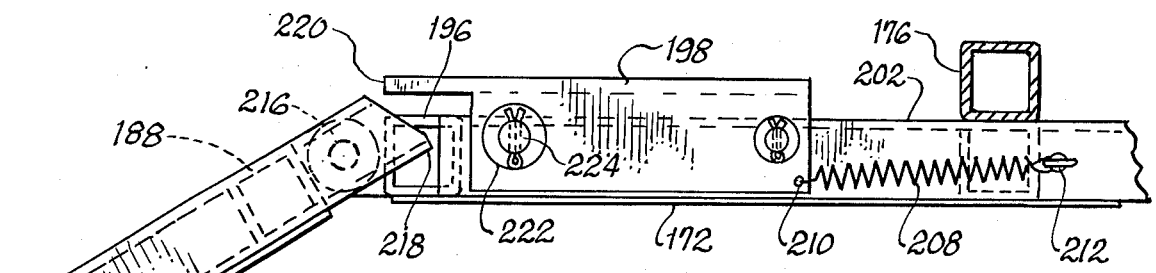
FIG. 15 is an enlarged fragmentary cross-sectional view taken about the line 15—15 of FIG. 12.
Figure 16:
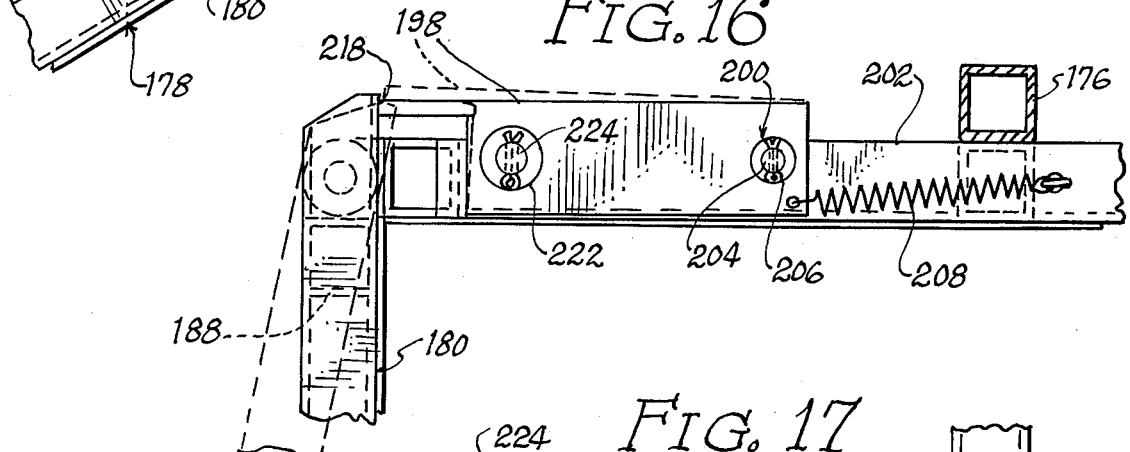
FIG. 16 is an illustration of the structure shown in FIG. 15 in the closed position.
Figure 17:
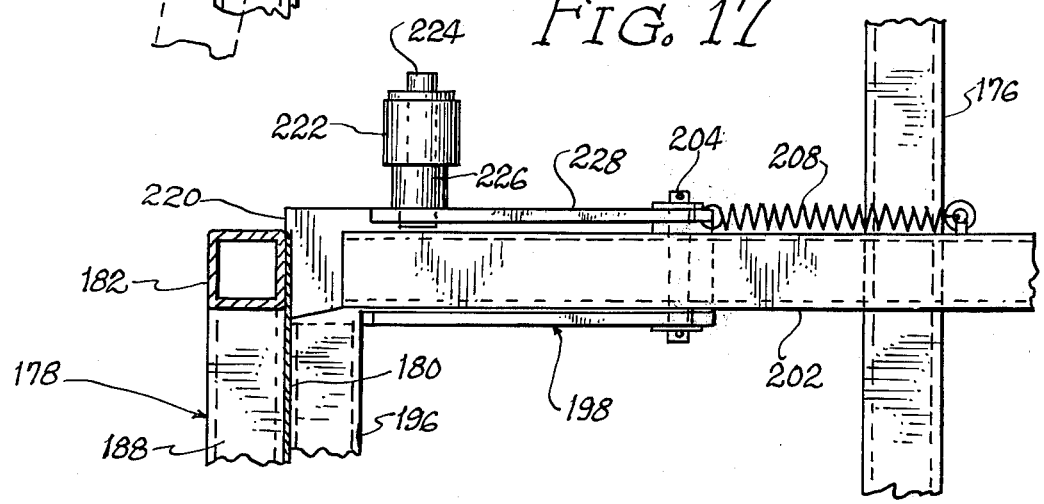
FIG. 17 is an elevational view of the structure shown in FIG. 16.
Figure 18:
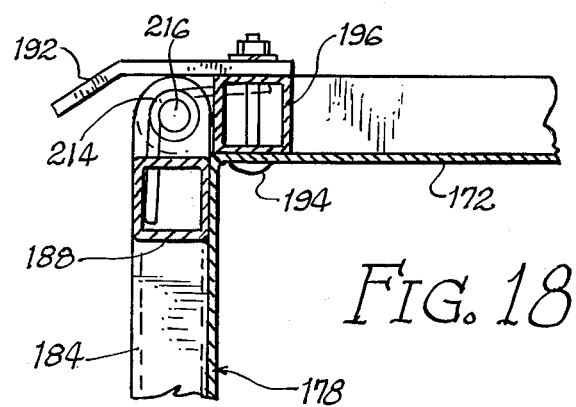
FIG. 18 is an enlarged fragmentary cross-sectional view taken about the line 18—18 of FIG. 12.

In the arrangement shown in FIG. 5, conveyor trays 54 are movable past a table 56 which receives articles from delivery belts 58. The delivery belts are associated with a system as described in copending application Ser. No. 223,596 now U.S. Pat. 3,276,344 wherein a plurality of articles are lined up on transfer belts 60 and then automatically delivered to the table 56. Pushers are movable on a main track 62 and are adapted to be selectively diverted by means of switches onto side tracks 64.

The illustrations of FIGS. 1 through 5 are provided for purposes of demonstrating how pusher mechanisms and switching concepts of this invention can be utilized in a variety of different arrangements. The following description provides structural details for pusher structures and switching mechanisms thereby providing examples of specific embodiments of the invention. It will be apparent that the structural arrangements to be described as well as obvious variations thereof can be incorporated in systems of the type shown in FIGS. 1 through 5 and in various other systems, for example as described in the aforementioned prior disclosures.

FIGS. 6 through 11 illustrate a pusher structure 70 including the article engaging pusher and the supporting mechanisms for the pusher. The article engaging surface of the pusher is provided by means of a sheet 72 which is secured by means of fasteners 74 to a transversely extending angle member 74. Vertically extending rectangular posts 78 are attached to the angle member, and these posts extend upwardly to a cross-bar assembly 80 and are in the assembly to a trolley 134. Vertically extending frame members 82 and transversely extending frame members 84 provide further support for the plate 72. As best shown in FIGS. 6 and 7, a bracket 86 is attached to the underside of angle member 78, and a brush 88 is held on this bracket. This arrangement may be utilized in operations where the pusher is required to move relatively thin articles over a supporting surface.

An end paddle 90 is supported by the pusher, and this end paddle carries an article engaging sheet 92 which is held by means of fasteners 94 to frame members 96. By means of the end paddle, the pusher is adapted to "corner" articles located on a table whereby the articles can be moved transversely across the table. A brush structure 98 may also be attached to the end paddle.

The cross bar assembly 80 comprises angle members 100 located at each end of the trolley. These angle members define openings which receive bushings 102, the bushings supporting shafts for wheels 104. The wheels 104 ride on the horizontal legs 106 and 108 defined respectively by the upper and lower tracks 110 and 112, and these wheels combined with the chain rollers 114 stabilize the assembly against vertical displacement. The chain rollers, as shown in FIG. 6, bear against the underside of horizontal legs 116 of angle members 118 which are supported by the lower tracks 112.

The particular configurations of the tracks 112 and the angle member 118 provide a highly desirable arrangement for supporting the moving cross bar frame. The horizontal legs 108 of the tracks are separated from the horizontal legs 116 of the angle members by a distance such that the chain rollers are held tightly against the underside of the legs 116. Subsequently, the wheels 104 are pressed against the legs 108 with this combination serving to stabilize an assembly and particularly serving to lock the paddles in a vertical plane. Accordingly, the arrangement avoids any gaps between the bottom of the paddles and the adjacent surfaces which would result if the paddles were permitted to tilt.

Brackets 120 are carried at the end of the wheel shafts, and these brackets support small rollers 122 which bear against the vertical legs of the tracks 110 and 112. This arrangement prevents horizontal displacement of the trolleys while at the same time providing smooth operation thereof.

The bushings 102 are attached to horizontal plate members 124 which are secured by means of fasteners 124 to horizontal frame members 128. Between the plates 124, the frame members 128 support horizontally extending U-shaped channel members 130. These channels receive wheels 132 which are carried by a rectangular trolley 134. The trolley 134 is made up of transversely extending angle members 136, the legs 138 of which support the wheels 132. These tranversely extending angle members are connected by means of angle members 140 to complete the trolley 134. The vertically extending posts 78 are secured to the frame members 140 of the trolley to thereby hold the pusher 70 in an assembly with the trolley.

It will be appreciated that with the arrangement of FIGS. 6 through 11, each of the pushers is mounted for longitudinal movement parallel with the tracks 110 and 112. In the embodiment illustrated, this movement is accomplished through chain drives 142 and 144. As best shown in FIG. 8, pins 146 and 148 extend inwardly from the respective chains for connection with the end members 100 of the cross bar assembly 80. Elements 150 are secured to these end members by means of fasteners 152, and these elements define pockets for receiving the pins 146 and 148 to provide the desired driving connection. These pins also provide a pivot axis for the cross bar assembly so that the assembly can be maintained in a horizontal plane throughout the operation. Suitable sprocket wheels are utilized for engagement with the chain drives whereby the pushers are moved in the Ferris Wheel fashion previously described.

A centrally located frame member 154 is carried by each frame 134 and a guide wheel 156 is supported on a shaft 158 which is received within a bushing 160 carried by the frame member 154. As shown in FIGS. 6 and 8, the guide wheels 156 move between guide track members 162. Referring to FIG. 4, the guide track members 162 are located in a position such that the guide track may serve as a side track as shown at 52. Thus, the pushers have been diverted to one side of the trolley structure and are, therefore, in position for picking up an article from a table 44. By providing a suitable curvature in the side track, the pushers will slide transversely across the trolley which will serve to move the article from the table onto a conveyor tray. The provision of the end paddle 90 corners the article to accomplish this result.

FIGS. 12 through 18 illustrate a modified form of pusher 170. In describing this structure, it will be understood that the pusher may be mounted on a trolley in essentially the same manner as described with reference to FIGS. 6 through 11.

The pusher structure 170 comprises a sheet 172 which serves as an article engaging face for the pusher. This sheet is mounted on a rectangular frame 174, and vertically extending posts 176 are connected to the rectangular frame for securing the pusher to a suitabale trolley.

An end paddle 178 is pivotally connected to the main portion of the pusher. A sheet 180 is secured to frame members of the end paddle including transversely extending frame members 182 and 184 and vertically extending frame members 186 and 188. The pivotal connection of the end paddle is provided by means of a hinge structure 190 which may be of any conventional design.

A plate 192 is secured by means of fasteners 194 to vertical frame member 196 of the main pusher. This plate defines an extension which is bent inwardly for engagement with the frame member 188 of the end paddle. As best illustrated in FIG. 14, this arrangement limits the degree of pivoting movement of the end paddle so that the paddle cannot reach a 180° position relative to the pusher.

A latch structure is associated with the pusher and end paddle for purposes of locking the end paddle in the 90° position relative to the pusher. This latch includes a channel-shaped member 198 which is pivotally connected at 200 to the horizontal frame member 202 of the pusher. A pin 204 extends through the side walls of the channel, and is secured by means of cotter pins 206 whereby the channel is adapted to pivot away from the frame member. A tension spring 208 is secured at one end 210 to the channel and at the other end 212 to the frame member. This arrangement normally urges the channel 198 to the horizontal position shown in FIG. 15.

A spring 214 is fit around the hinged shaft 216, and this spring normally urges the end paddle 178 to the open position as shown in FIG. 14. In its normal condition, that is, without any outside element influencing the position of the end paddle relative to the pusher, the end paddle assumes the position shown in FIG. 14. When forced to the 90° position, the abutting edge 218 of the end paddle engages the outer end 220 of the channel member 198. Since the spring 208 holds this channel member in the solid line position shown, the end paddle is effectively locked in the 90° position.

The channel member 198 supports a roller 222 which is mounted on a shaft 224 carried in a bushing 226 secured to the side wall 228 of the channel member. This roller serves as a means for driving the channel member to the dotted line position shown in FIG. 16 which removes the engagement of the surfaces 218 and 220. The end paddle 178 can then move in response to the action of spring 214 into the open position.

An arrangement of the type described in FIGS. 12 through 18 is particularly suited for an operation such as shown in FIGS. 1 through 3. In this arrangement, each pusher is diverted from a main track to a side track and a space of set dimension always occurs between two adjacent pushers on a side track. Accordingly, it is advantageous to move the end paddles to an open position for insertion of articles onto a table 18 thereby providing greater space for the insertion operation and thereby permitting an increased speed of conveyor operation.

Each of the end paddles carries a roller 230 at its outer end. This roller is adapted to engage any suitable cam surface whereby the end paddle can be driven from the open position shown in FIG. 14 to the latched position of FIG. 16. Referring to FIGS. 1 and 12, a cam rail such as shown at 232 can be utilized for this purpose. To accomplish the desired action, the tracks 26 and 30 include an inwardly curved portion opposite the cam rails which automatically drives the roller 230 into engagement with the rails. As the paddle movement progresses, the end paddle is gradually moved into the 90° position, and this forces the channel member 198 outwardly until the abutting edge 218 of the end paddle moves beyond the edge 220 of the channel member. The spring 208 then moves the channel member into latching position. It will be noted that the rails 232 are located beyond the delivery belts at a particular station so that the end paddles are not latched until an article has been picked up. Any suitable means may be employed for supporting the rails and the supporting means are preferably adjustable.

Figure 19:
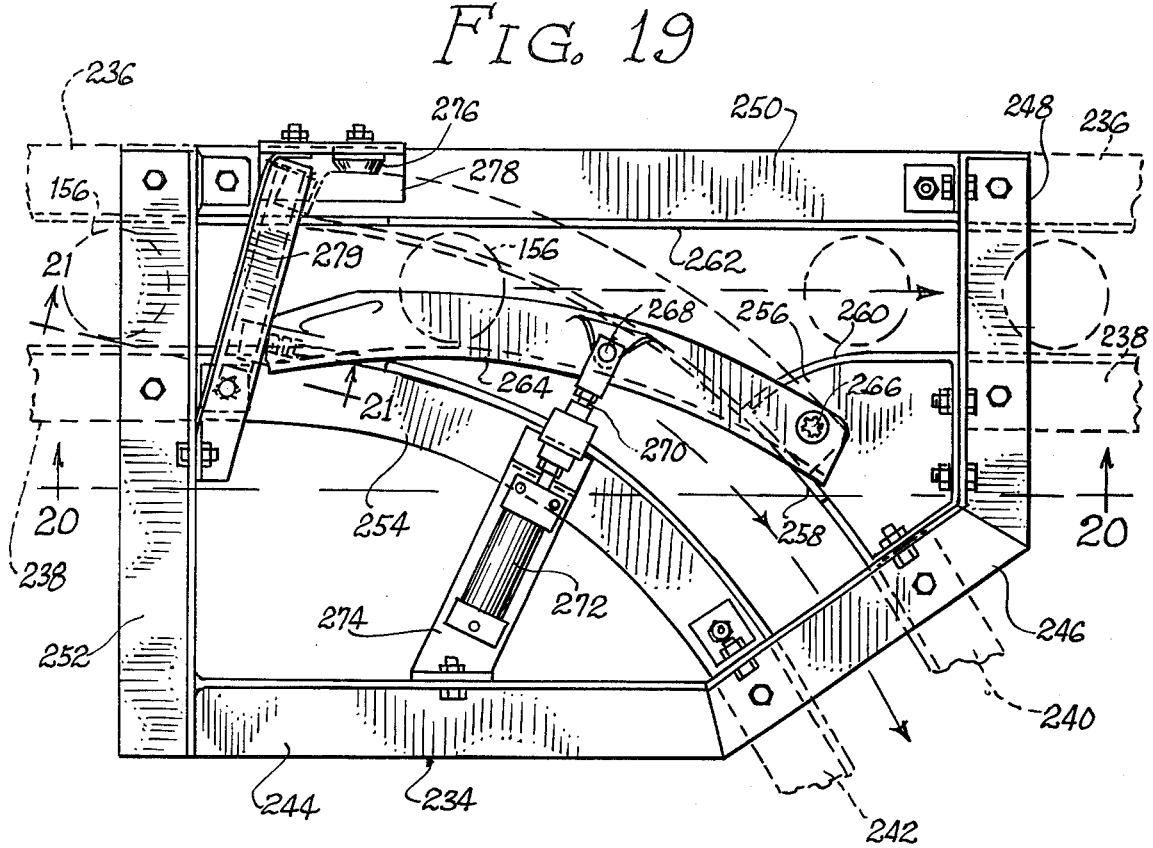
FIG. 19 is a fragmentary plan view illustrating a switch mechanism utilized in association with the pusher guide tracks.
Figure 20:
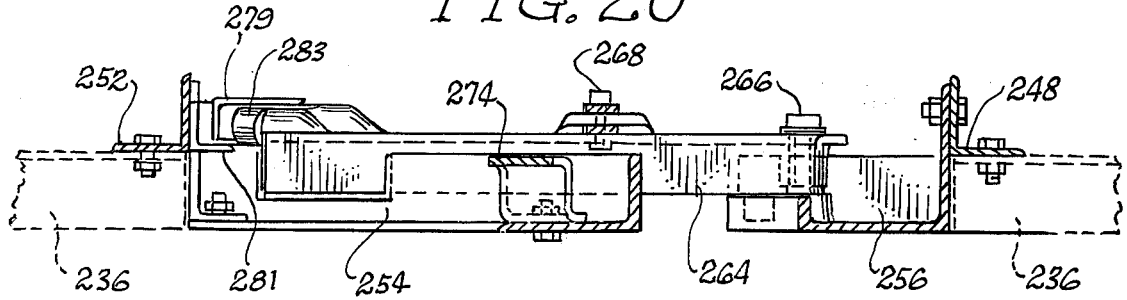
FIG. 20 is a cross sectional view taken about the line 20—20 of FIG. 19.
Figure 21:
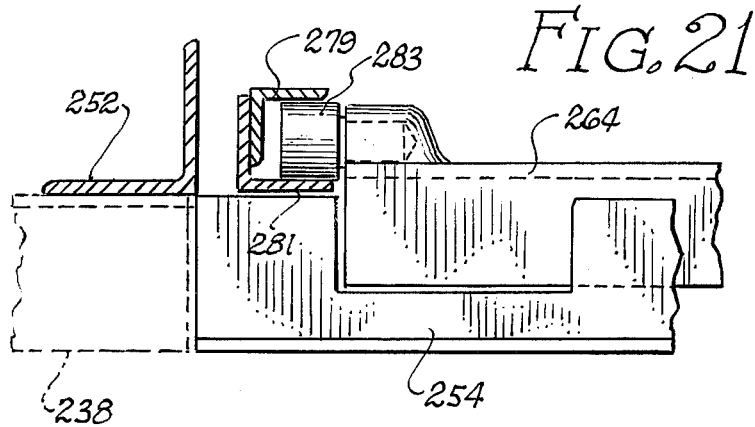
FIG. 21 is a cross-sectional view taken about the line 21—21 of FIG. 19.

FIGS. 19 through 21 illustrate a switch structure of the type suitable for applications as generally described in FIGS. 4 and 5. The switch structure generally designated by the numeral 234 is associated with a main track defined by rails 236 and 238. A side track define by rails 240 and 242 intersects with the main track with the switch structure being located at this intersection.

The switch structure includes frame members 244, 246, 248, 250 and 252. A curved rail section 254 is connected between the frame members 252 and 246. This curved rail section 254 provides a continuation of the main track rail 238 and extends to the side track rail 242.

A second rail section 256 is connected to the frame members 246 and 248. This second rail section includes a first surface 258 which serves as a continuation of the working surface defined by rail 240. The surface 260 of the rail section 256 extends to the main track rail 238. The inner surface 262 of the frame member 250 provides a continuation of the working surfaces of the main rails 236.

A movable rail member 264 is pivotally connected to rail section 256 at 266. This rail member is attached at 268 to piston 270 which is reciprocally operated by cylinder 272. A bracket 274 connected to frame member 244 supports the cylinder 272.

In the operation of a switch of the type shown in FIGS. 19 through 21, the cylinder 272 is adapted to extend and retract the piston 270 for pivoting the rail member 264 between the solid and dotted line positions shown. The cylinder may be normally retracted whereby the pusher wheels shown in dotted lines, for example pusher wheels as illustrated at 156 in FIG. 6, will move along the main track defined by the rails 236 and 238. When the piston rod is extended, the track member 264 is pivoted to the dotted line position shown in FIG. 19 which operates to automatically direct the roller 156 onto the side track defined by rails 240 and 242. In view of the high speed operation involved, bumpers such as shown at 276 are mounted on bracket 278 to eliminate any damage caused by high speed operation of the cylinder 272, and to eliminate damage caused by the engagement of rollers 156 with the track member 264. To facilitate smooth operation, a guide rail defined by members 279 and 281 is provided for receiving roller 283 carried by the member 264.

As indicated, arrangements of the type shown in FIGS. 4 and 5 are suitable for use in conjunction with switches as shown in FIGS. 19 through 21. The operation of the cylinders 272 can be determined by the presence of an article on a table located adjacent a conveyor. For example, if an electric eye (as shown diagramatically at 277 in FIG. 4) detects an article, the singal generated can be utilized to operate a switch whereby the next pusher on the main track will be diverted onto a side track for picking up the article. This arrangement which amounts to random use of pushers is of particular advantage where a highly predictable volume of articles for a given time period is not available. Thus, the switches are utilized only when necessary, and at low volume periods, one or more of the delivery belts can be completely shut sown so that only one switch is operating. Economies are particularly realized in systems as shown in FIG. 5 where each movable belt and other delivery mechanisms represent a rather costly operation. With the switch arrangement described. the delivery of packages to a conveyor can be carried out on a mush more efficient basis.

In a preferred form of the invention, the cylinder 272 performs a complete cycle during each switching operation. Specifically, the cylinder operates to extend the piston 270 to place the rail member 264 in the dotted line position for diverting a pusher roller 156 onto a side track. The retraction of the piston is then carried out very shortly after the roller 156 contacts the rail member whereby the return pivoting movement of the rail member operates to assist in driving the roller onto the side track. This immediate retraction also clears the main track for the next roller or permits rapid return of the rail member depending upon the desired path for the next roller. Alternatively, if the next roller is to be moved onto the side track, the rail member may be caused to remain in position by suitable control mechanisms. The control mechanisms utilized in the system may include a simple time delay operation for controlling the extending and restracting stroke of the piston so as to achieve this positive assist for the pushers.

The switch structure of FIGS. 19 through 21 is adapted to be used in conjunction with a discharge system as described at the right-hand side of FIG. 1. Thus, the selective operation of the switch can be utilized for selectively diverting pushers from the main track 36 onto a side track 38.

FIGS. 22 through 24 illustrate a modified pusher and end paddle construction. The pusher includes a sheet 280 for engaging articles, and this sheet is mounted on a frame 282. A hinge including pin member 284 pivotally connects the pusher to pivotal end paddle 286. A metal sheet 288 is also used here for engagement with articles to be moved.

A stop member 290 is attached to the end paddle 286 by means of fasteners 292. A spring 293 urges the end paddle to the position shown in FIG. 23, and this stop member serves essentially the same function as the stop member previously descried. Thus, the angled end of the stop member insures that the end paddle cannot move to the full 180° position. This arrangement is necessary where a roller as shown at 294 is employed for movement against a cam rail for driving the end paddle to the closed position.

The end paddle defines a latching element 296 which includes a surface adapted to engage the top surface 298 of a spring mounted pin 300 reciprocally received within a housing 302 carried on the frame 282. The spring 304 contained within the housing serves to hold the pin 300 in the extended position. When the end paddle 286 is driven to the 90° position, the latch member 296 forces the pin rearwardly until the latch engages surface 298. This latching action occurs when the spring 304 snaps the pin 300 into latching position, and the latched position is retained until the pin 300 is backed away. A roller 306 is attached to the pin, and upon engagement with a suitable cam, this roller serves to drive the pin rearwardly to unlatch the end paddle. A spring such as is associated with the pivoting end paddle of FIG. 18 will drive the end paddle to the open position when it is unlatched.

The structure of FIGS. 22 through 24 is also suitable for use in an arrangement of the type shown in FIGS. 1 through 3. The roller 294, when engaged with a cam rail 232 will result in closing of the end paddle. This closed relationship is maintained until the article held by the paddle is moved into a suitable discharge bin. During the return travel of the pushers, and prior to movement onto a side track, a cam is adapted to engage roller 306 so that the end paddles will have moved to the open position before the next article is picked up by the paddle. This cam can be located for engagement with the latching mechanisms at any position after the articles are separated from the pushers, for example, during movement of the pushers along the lower line of travel. A similar arrangement can be utilized with respect to any of the embodiments illustrated herein.

The above description provides distinct improvements with respect to pusher constructions employing pivotally mounted end paddles. In particular, the designs illustrated provide a highly simplified automatic operation of swinging end paddles which enables efficient production of high speed conveyor equipment. In this connection, the pushers are particularly disigned to provide a stationary end paddle in combination with a pivoting end paddle as shown in FIG. 1 and as more particularly shown in detail by the end paddle 177 illustrated in FIGS. 12–14.

With respect to the systems employing switch constructions, applicant's arrangement provides a highly unique concept for random selection of paddles to be utilized for picking up articles situated on a table or the like. As indicated, the switch constructions are preferably operated so that pushers will move into position for picking up articles only if an article is located to be picked up. In the event that there is no article in position at a particular table location, the pushers will simply by-pass this position whereby the pushers will be available for use at later positions in the loading location.

The random selection concept permits very high speed operation while also permitting selective operation depending on the demands on the system at a given time. Thus, by shutting down one or more switches, a single switch could be utilized for handling all articles, and significant portions of a system need not be utilized on a full time basis. The selective operation also avoids down time since a breakdown of a portion of a system, for example, a malfunction of a belt 42 in FIG. 4, will not affect an adjacent system so that at least some operation can be conducted during repairs.

The invention also contemplates the use of slider beds or moving belts in place of systems utilizing conveyor trays. As best illustrated in FIGS. 1 through 3, applicant's structure provides for the loading of articles onto a bed, movement of the articles by means of pushers, and then discharge of the articles at selected locations through the use of the same pushers. Where a moving belt is utilized as the supporting bed for articles engaged by pushers, the belt can conveneintly be operated at a speed slightly slower than the pusher speed thereby insuring that the articles stay in engagement with the pushers.

With the use of pusher mechanisms in the manner described, the handling of articles is much less likely to cause damage since the articles are firmly held even though moving at high speed. It is also significant that the pushers hold the articles in precisely determined positions which greatly facilitates utilization of automatic scanning and reading equipment, for example, equipment for reading addresses.

The arrangements described are also particularly useful due to the fact that the location of induction mechanisms (for example, the induction means 42 in FIG. 4) is not critical. Thus, it will be appreciated that the induction mechanisms could place packages in virtually any position on the tables 44 for pick-up by the pushers. Furthermore, the relation of one induction mechanism to the next is not in any way critical so that the location of these induction mechanisms can be arranged to fit the particular building conditions at the location of the construction.

The concepts of the invention are adapted to the "over and under" type system as well as the "carrousel" type system. For purposes of facilitating address reading, the system of the invention is also readily adapted to the use of slightly tilted belts or undulating belts.

It will be understood that various changes and modifications may be made in the system described which provide the characteristics of the invention without departing from the spirit thereof particularly as defined in the following claims.

That which is claimed is:

1. In a system for loading articles on a conveyor wherein table means are provided for supporting the articles alongside the conveyor, said conveyor moving adjacent the table means, and including pushers mounted for movement over said table means to engage the articles and to transfer the articles to the conveyor, the improvement in means for mounting said pushers comprising a main track, said main track extending parallel with said conveyor, at least one side track extending away from said main track, said side track extending over said table means for directing said pushers to said table means, switch means at an intersection to said main track and said side track, means normally holding the switch means in the open position whereby said pushers normally remain on said main track, and means for operating said switch means when an article is present on said table means whereby a pusher moves over the table means to engage an article and move the article from the table means, said side track extending back to said main track whereby a pusher on the side track is moved back to said main track after moving over said table means, and whereby the associated article is moved onto the conveyor.

2. A construction in accordance with claim 1 wherein said conveyor comprises a surface movable relative to said table means.

3. A construction in accordance with claim 1 wherein said conveyor comprises a stationary surface, the pushers on said main track operating to convey articles supported on the stationary surface, and additional switch means for said pushers positioned at discharge locations adjacent said stationary surface, additional side tracks connected to said main track at each discharge location, said additional switch means operating to selectively move said pusher means onto the side tracks to achieve the removal of articles from said stationary surface at the discharge locations.

4. A construction in accordance with claim 1 including discharge locations adjacent said conveyor, code applying means for designating articles on said table means for discharge at particular discharge locations, and means operating in response to the codes applied for removing articles from the conveyor at the discharge locations.

5. In a construction including pushers adapted to engage articles located on a supporting surface and to move the articles over said surface from one position to another, the improvement in means for mounting said pushers comprising a main track, said main track extending over a first area of said supporting surface, at least one side track extending away from said main track over a second area of said supporting surface alongside the first area, switch means at an intersection of said main track and said side track, means normally holding the switch means in the open position whereby said pushers normally remain on said main track, said side track extending over said second area for directing said pushers to said second area, and means for operating said switch means when an article is present on said second area whereby a pusher moves over the second area and is adapted to engage an article located on the second area and to move the article from the second area, said side track extending back to said main track whereby a pusher on a side track is moved back to said main track while moving the article from said second area to said first area.

6. A construction in accordance with claim 5 wherein said main track extends to a plurality of discharge positions located adjacent said supporting surface, additional side tracks extending from said main track to said discharge positions, and additional switch means for said pushers positioned at the discharge positions, said additional switch means operating to selectively move said pusher means onto the side tracks to achieve the transfer of articles from said supporting surface to said discharge locations.

7. In a system for loading articles on a conveyor wherein table means are provided for supporting the articles, said conveyor moving adjacent the table means, and pushers mounted for movement over said table means to engage the articles and to transfer the articles to the conveyor, said pushers including a pivotally connected end paddle whereby the paddle can be moved to a closed position substantially perpendicular with the pusher to thereby corner an article for moving the article transversely to the path of coneyor movement, and whereby the paddle can be moved to the open position before introducing an article in front of the pusher, the improvement comprising means for holding said end paddles in the closed position, said holding means comprising latching means defined between said pusher and said paddle, spring means normally urging said paddle to the open position and means extending outwardly of said pusher connected to said latching means for operating said latching means out of holding position whereby said end paddle is moved to the open position.

8. A construction in accordance with claim 7 including stop means for limiting movement of the paddle from the closed position substantially perpendicular to the pusher to the open position which is short of a parallel relationship with the pusher.

9. A construction in accordance with claim 7 including cam means adjacent said table means for engaging the end of a paddle after the pusher picks up an article from the table means, said cam driving said paddle to the closed position in opposition to said spring means.

10. A construction in accordance with claim 9 including a track providing a guide for said pushers, said track including a portion extending inwardly toward said cam for achieving the movement of the end of the paddle into engagement with the cam for driving said paddle to the closed position.

11. In a system for loading articles on a conveyor wherein table means are provided for supporting the articles, said conveyor moving adjacent the table means, and including pushers mounted for movement over said table means to engage the articles and to transfer the articles to the conveyor, the improvement in means for mounting said pushers comprising a main track, said main track extending parallel with said conveyor, at least one side track extending away from said main track, switch means at the intersection of said main track and said side track, means normally holding the switch means in the open position whereby said pushers normally remain on said main track, said side track directing said pushers to said table means, and means for operating said switch means respective to the presence of an article on said table means, said side track extending back to said main track whereby a pusher on the side track is moved back to said main track after moving over said table means, and wherein said switch means comprises a pivoting track section, and an operating cylinder including a piston attached to said track section for movement of the track section from the open switch position to the switching position, said track section being normally maintained in the open switch position, and control means for operating the cylinder to move the track section to the switching position, said control means including means for extending said piston when moving the track section to the open position and for retracting said piston when moving the track section to the switching position.

12. A construction in accordance with claim 11 wherein said control means operates to retract said piston substantially immediately after the pusher has moved into engagement with the track section whereby retraction of the piston operates to positively assist driving of the pusher onto the side track.

13. A construction in accordance with claim 11 wherein said tracks comprise spaced apart members, said pushers carrying guide rollers moving between opposed surfaces of said track members, said pivoting track section defining a movable roller engaging surface for positively assisting in driving the pusher onto a side track during retracting movement of said piston.

14. A construction in accordance with claim 11 wherein said switch means is formed of a plurality of interconnected frame members, said frame members defining continuations of the spaced apart members forming said main track and said side tracks, and said frame members providing means for supporting said cylinder and said pivoting track section.

15. In a construction including pushers adapted to engage articles located on a supporting surface and to move the articles over the surface from one position to another, the improvement in means for mounting the pushers comprising a frame assembly including transverse members and interconnecting longitudinally extending members, wheels carried by said longitudinally extending members and extending outwardly from each end of the assembly, spaced apart longitudinally extending tracks positioned outwardly from said longitudinally extending members on either side of the assembly, said tracks defining horizontal legs engaged by said wheels, roller chain means connected to the frame and located on both sides of said frame outwardly of said wheels, and second horizontal legs positioned above said first mentioned horizontal legs to provide a bearing surface for said rollers, the rollers engaging the bearing surface whereby the combination of the bearing surface and tracks confines the rollers and wheels against vertical displacement.

* * * * *